(12) United States Patent
Choi et al.

(10) Patent No.: US 6,958,788 B2
(45) Date of Patent: Oct. 25, 2005

(54) LIQUID CRYSTAL DISPLAY DEVICE AND METHOD OF FABRICATING THE SAME

(75) Inventors: Woo Hyuk Choi, Buk-ku (KR); Sang Chul Lee, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 114 days.

(21) Appl. No.: 10/620,592

(22) Filed: Jul. 17, 2003

(65) Prior Publication Data

US 2004/0070698 A1 Apr. 15, 2004

(30) Foreign Application Priority Data

Sep. 17, 2002 (KR) ................................ 10-2002-0056503

(51) Int. Cl.$^7$ ................................ G02F 1/133
(52) U.S. Cl. ................................ 349/43; 349/38; 349/39
(58) Field of Search ................................ 349/43, 38, 39

(56) References Cited

U.S. PATENT DOCUMENTS

| | | | | |
|---|---|---|---|---|
| 6,091,466 A | * | 7/2000 | Kim et al. | 349/43 |
| 6,337,723 B1 | * | 1/2002 | Bae | 349/43 |
| 6,356,318 B1 | * | 3/2002 | Kawahata | 349/38 |
| 6,580,474 B1 | * | 6/2003 | Ahn et al. | 349/43 |
| 6,621,545 B2 | * | 9/2003 | Park et al. | 349/141 |
| 6,707,512 B2 | * | 3/2004 | Takahashi et al. | 349/43 |
| 2003/0007108 A1 | * | 1/2003 | Hwang et al. | 349/43 |
| 2003/0053005 A1 | * | 3/2003 | Song et al. | 349/43 |
| 2003/0202131 A1 | * | 10/2003 | Ahn et al. | 349/43 |
| 2003/0206252 A1 | * | 11/2003 | Ahn et al. | 349/43 |
| 2003/0214613 A1 | * | 11/2003 | Ahn et al. | 349/43 |
| 2004/0061809 A1 | * | 4/2004 | Lee | 349/43 |
| 2004/0070698 A1 | * | 4/2004 | Choi et al. | 349/43 |

* cited by examiner

*Primary Examiner*—James A. Dudek
(74) *Attorney, Agent, or Firm*—Morgan, Lewis & Bockius LLP

(57) ABSTRACT

A liquid crystal display device includes a gate line having a first width formed extending along a first direction on a substrate, a gate insulation film formed to cover the gate line, a semiconductor layer formed on the gate insulation film, a storage contact hole having a first width exposing a portion of the semiconductor layer, and a pixel electrode having a first end portion extending along a second direction perpendicular to the first direction to electrically contact the semiconductor layer through the storage contact hole, the first end portion has a first length larger than the first width of the gate line, wherein the first width of the storage contact hole is larger than the first width of the gate line.

29 Claims, 10 Drawing Sheets

LIQUID CRYSTAL DISPLAY DEVICE AND METHOD OF FABRICATING THE SAME

The present invention claims the benefit of Korean Patent Application No. P2002-56503 filed in Korea on Sep. 17, 2002, which is hereby incorporated by reference.

BACKGROUND OF THE INVENTION

1. Field of the Invention

The present invention relates to a display device and a method of fabricating a display device, and more particularly to a liquid crystal display device and a method of fabricating a liquid crystal display device.

2. Description of the Related Art

In general, a liquid crystal display (LCD) device displays images by adjusting a transmittance of a liquid crystal material using an electric field. The LCD device comprises a liquid crystal display panel having liquid crystal cells arranged in a matrix configuration and a driving circuit to drive the liquid crystal display panel. In addition, pixel electrodes and a common electrode are mounted in the liquid crystal display panel in order to induce the electric field to the liquid crystal material. Each of the pixel electrodes is provided at every liquid crystal cell formed on a lower substrate, and the common electrode is formed as a single electrode across an entire surface of an upper substrate. Each of the pixel electrodes is connected to a thin film transistor (TFT), which functions as a switching device, wherein the pixel electrode and common electrode drive the liquid crystal cell in accordance with a data signal supplied through the thin film transistor.

Figure 1:
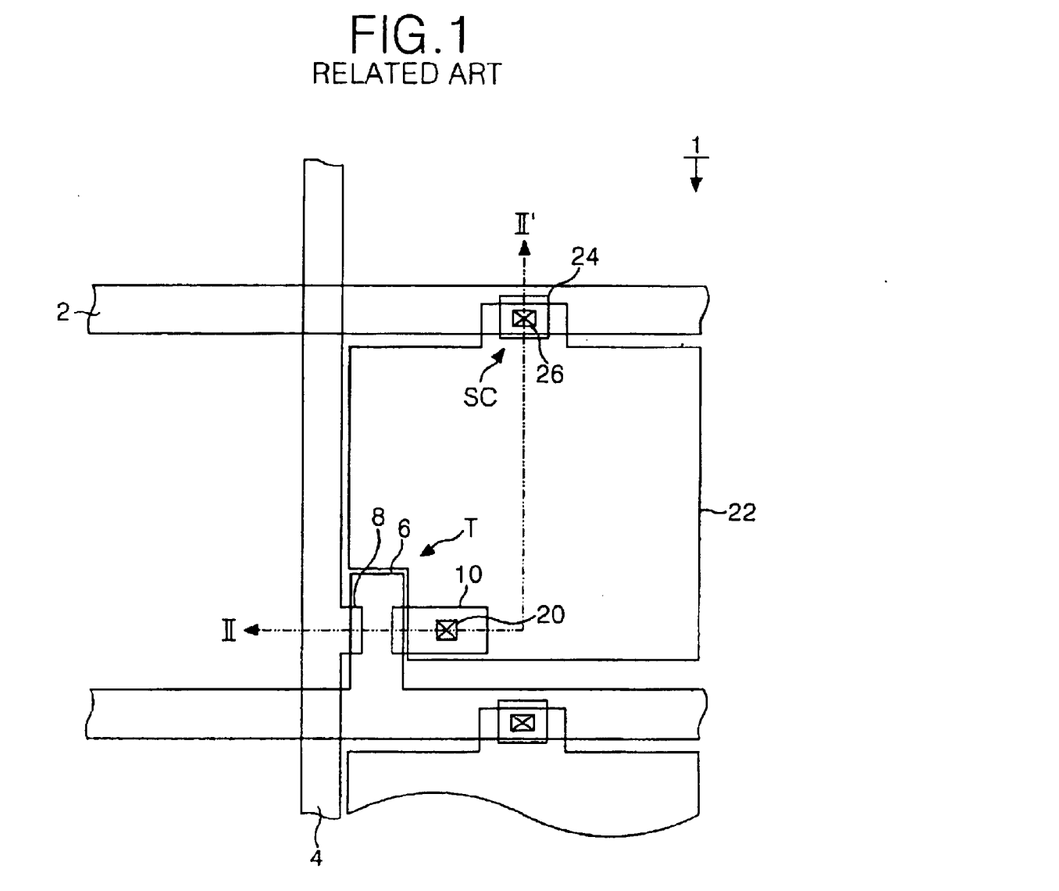
FIG. 1 is a plan view of a lower substrate of an LCD device according to the related art.
Figure 2:
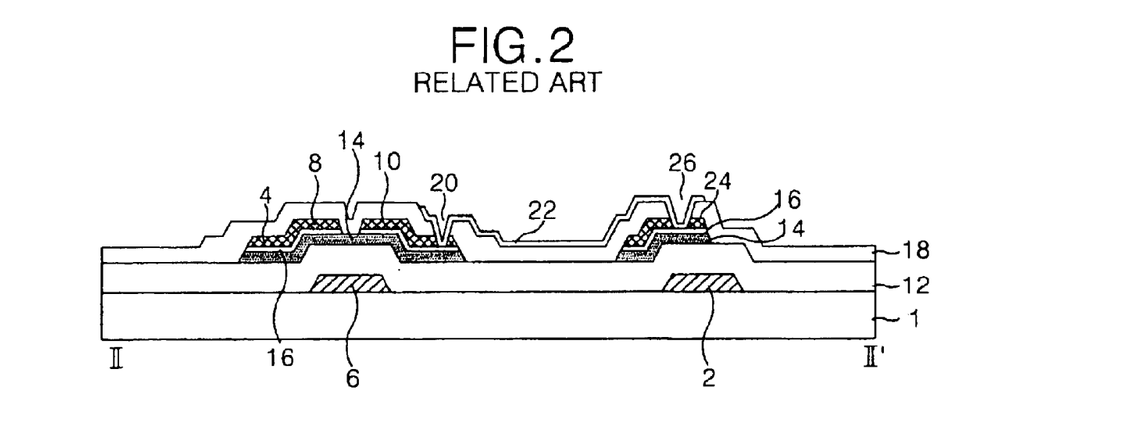
FIG. 2 is a cross sectional view along II–II' of FIG. 1 according to the related art.

FIG. 1 is a plan view of a lower substrate of an LCD device according to the related art, and FIG. 2 is a cross sectional view along II–II' of FIG. 1 according to the related art. In FIGS. 1 and 2, a lower array substrate comprises a thin film transistor (TFT) T that is located at an intersection of a data line 4 and a gate line 2, a pixel electrode 22 connected to a drain electrode 10 of the TFT T, and a storage capacitor SC located at an overlapping part of the pixel electrode 22 and a pre-stage gate line 2.

The TFT T comprises a gate electrode 6 connected to the gate line 2, a source electrode 8 connected to the data line 4, and the drain electrode 10 connected to the pixel electrode 22 through a drain contact hole 20. In addition, the TFT T comprises semiconductor layers 14 and 16 to form a conducting channel between the source and drain electrodes 8 and 10 by using a gate signal supplied to the gate electrode 6. Accordingly, the TFT T selectively provides the pixel electrode 22 with a data signal from the data line 4 in response to a gate signal supplied to the gate line 2.

The pixel electrode 22 is located in a cell region partitioned by the data and gate lines 4 and 2 and is made of a transparent conducting material having a high light transmittance. The pixel electrode 22 is formed on a protection layer 18, which is provided on an entire surface of the lower array substrate, and is electrically connected to the drain electrode 10 through the drain contact hole 20 formed through the protection layer 18. Accordingly, the pixel electrode 22 generates a potential difference from a common transparent electrode (not shown) formed on an upper substrate by the data signal supplied through the TFT T. Liquid crystal molecules of a liquid crystal material provided between the lower substrate 1 and the upper substrate (not shown) rotate because of a dielectric anisotropy created by the potential difference. Thus, incident light transmitted through the pixel electrode 22 from a light source is transmitted to the upper substrate by the rotation of the liquid crystal molecules.

The storage capacitor SC functions to restrain a voltage fluctuation of the pixel electrode 22. The storage capacitor SC comprises an adjacent (i.e., pre-stage) gate line 2, a gate insulation film 12, and the semiconductor layers 14 and 16 provided between the pre-stage gate line 2 and a storage electrode 24 interconnect to the pixel electrode 22 via a storage contact hole 26.

Figure 3A:
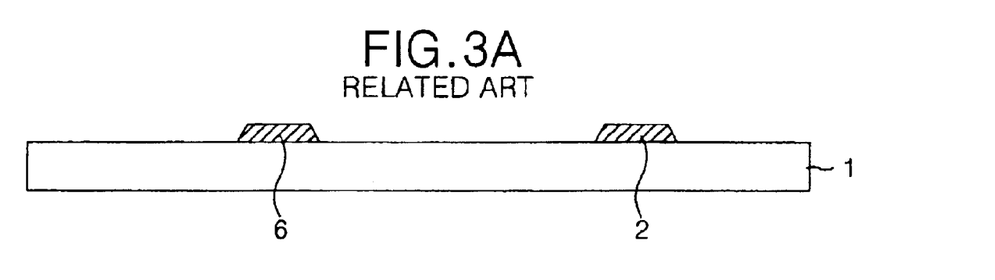
FIGS. 3A to 3D are cross sectional views of a method of fabricating the lower substrate of FIG. 2 according to the related art.

FIGS. 3A to 3D are cross sectional views of a method of fabricating the lower substrate of FIG. 2 according to the related art. In FIG. 3A, the gate electrode 6 and the gate line 2 are formed on the lower array substrate 1. Then, a gate metal layer is formed on the lower array substrate 1 by a deposition method, such as a sputtering, and includes aluminium (Al) or an aluminium alloy. Next, the gate metal layer is patterned by photolithograpic and etching processes using a first mask, thereby forming the gate electrode 6 and the gate line 2 on the lower array substrate 1

Figure 3B:
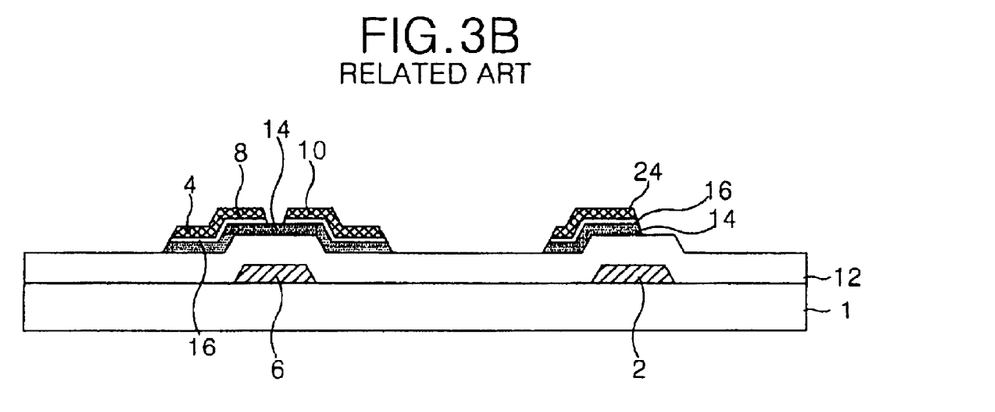

In FIG. 3B, the gate insulation film 12, the first semiconductor layer (i.e., active layer) 14, the second semiconductor layer (i.e., ohmic contact layer) 16 an ohmic contact layer 16, the source electrode 8, the drain electrode 10, the storage electrode 24, and the data line 4 are formed on the lower array substrate 1 having the gate electrode 6 and gate line 2.

For example, the gate insulation film 12, the first and second semiconductor layers 14 and 16 and a data metal layer are sequentially deposited using a deposition method, such as chemical vapor deposition and sputtering, on the lower array substrate 1. The gate insulating film 12 includes silicon oxide (SiOx) or silicon nitride (SiNx), the first semiconductor layer 14 includes undoped amorphous silicon, the second semiconductor layer 16 includes impurity-doped amorphous silicon, such N-type or P-type impurities, and the data metal layer includes molybdenum (Mo) or an molybdenum alloy.

Next, a photoresist pattern is formed by photolithograpic processes using a second mask on the data metal layer. Accordingly, a diffraction mask having a diffraction part corresponding to a channel part of the TFT T is used as the second mask, whereby the photoresist pattern of the channel part has a height lower than a height of a source/drain pattern part and a storage pattern part. Then, the data metal layer is patterned by wet etching processes using the photoresist pattern to form the data line 4, the storage electrode 24, and the source and drain electrodes 8 and 10.

Next, the first and the second semiconductor layers 14 and 16 are simultaneously patterned by dry etching processes using the same photoresist pattern to form the active layer 14 and the ohmic contact layer 16. Then, the photoresist pattern is removed by ashing processes, the source/drain pattern part and an ohmic contact layer of the channel part are etched by dry etching processes. Accordingly, the active layer 14 of the channel part is exposed to separate the source electrode 8 and the drain electrode 10. Then, the photoresist pattern remaining in the source/drain pattern part is removed by stripping processes.

Figure 3C:
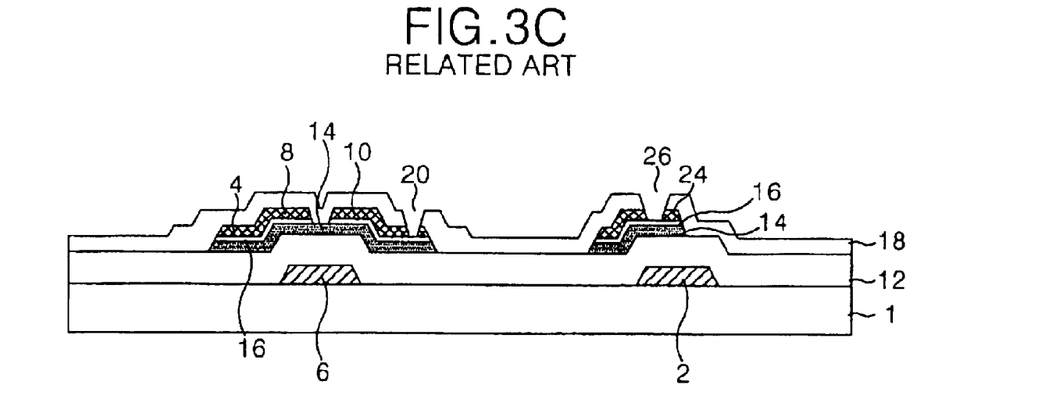

In FIG. 3C, the protection film 18 is formed on the gate insulation film 12 in which the source electrode 8, the drain electrode 10, the storage electrode 24, and the data line 4 are formed on the lower array substrate 1. The protection film 18 includes one of an inorganic insulation material, such as silicon oxide (SiOx) or silicon nitride (SiNx), or one of an acryl organic compound or organic insulation material, such as benzocyclobutene (BCB) and perfluorocyclobutane (PFCB). Then, the insulation film 18 is patterned by the photolithograpic and etching processes by using a third mask to form the drain contact hole 20 and the storage contact hole 26. The drain contact hole 20 extends through the protection film 18 and the drain electrode 10 to expose the ohmic contact layer 16, and the storage contact hole 26 extends through the protection film 18 and the storage electrode 24 to expose the ohmic contact layer 16.

Figure 3D:
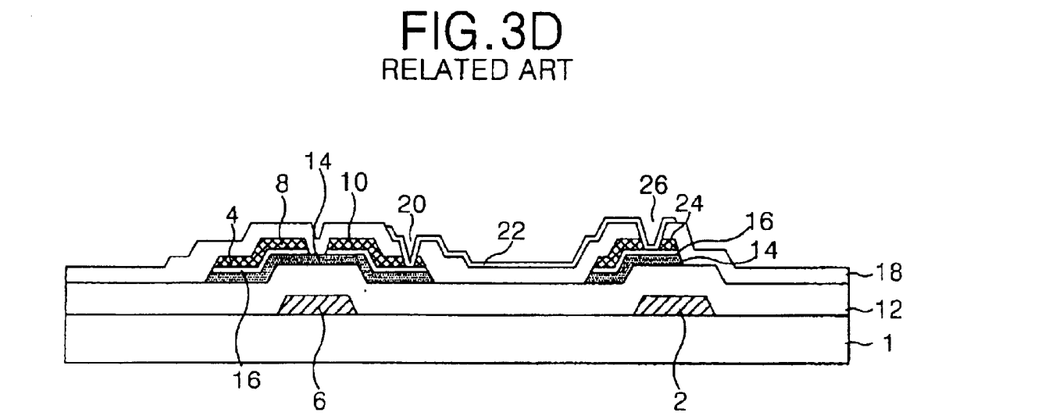

In FIG. 3D, the pixel electrode 22 is formed on the protection film 18 by forming the transparent metal layer on the protection film 18 by the deposition method, such as sputtering. The transparent metal layer is made of Indium-Tin-Oxide (ITO), Indium-Zinc-Oxide (IZO), or Indium-Tin-Zinc-Oxide (ITZO). Then, the transparent metal layer is patterned by the photolithograpic and etching processes using a fourth mask to form the pixel electrode 22. Accordingly, the pixel electrode 22 contacts the drain electrode 10 through the drain contact hole 20 and contacts the storage electrode 24 through the storage contact hole 26.

Accordingly, in large-sized LCD devices, a capacitance (Cst) of the storage capacitor SC must be large in order to maintain a stable pixel voltage. However, since the storage capacitance is proportional to the capacitance (Cst) of the storage capacitor SC, an aperture ratio decreases. Accordingly, the capacitance (Cst) of the storage capacitor SC is increased by reducing a gap between the storage electrode 24 and the gate line 2.

However, the LCD device formed with the four masks limits increases of the capacitance (Cst) of the storage capacitor SC since the storage capacitor 24 and the first and second semiconductor layers 14 and 16 are simultaneously formed by the same pattern. For example, since the storage capacitor SC comprises the gate line 2, the gate insulation film 12, and the pixel electrode 22 and the first and second semiconductor layers 14 and 16, the gate insulation film 12 has a thickness of 4000 Å and a thickness of the first and second semiconductor layers 14 and 16 is 2000 Å. Accordingly, increasing of the capacitance (Cst) of the storage capacitor SC includes reducing the interval between the pixel electrode 22 and the gate line 2.

Figure 4:
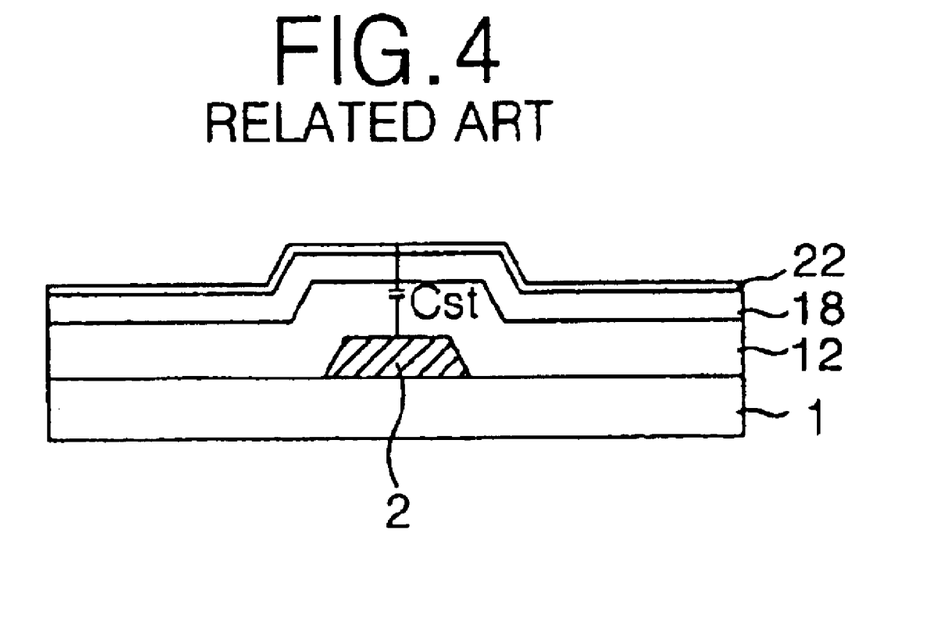
FIG. 4 is a cross sectional view of a storage capacitor of an LCD device according to the related art.

FIG. 4 is a cross sectional view of a storage capacitor of an LCD device according to the related art. In FIG. 4, a storage capacitor includes a gate line 2, a gate insulation film 12 and a protection film 18, and a pixel electrode 22. Accordingly, the gate insulation film 12 formed between the gate line 2 and the pixel electrode 22 has a thickness of 4000 Å and the protection film 18 has a thickness of 2000 Å of the thickness. Thus, since thicknesses of the gate line 2 and the pixel electrode 22 are limited, increasing the capacitance (Cst) of the storage capacitor is limited.

SUMMARY OF THE INVENTION

Accordingly, the present invention is directed to a liquid crystal display device and a method of fabricating a liquid crystal display device that substantially obviates one or more of the problems due to limitations and disadvantages of the related art.

An object of the present invention is to provide a liquid crystal display device and a method of fabricating a liquid crystal display device having a storage capacitor with an increased capacitance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a gate line having a first width formed extending along a first direction on a substrate, a gate insulation film formed to cover the gate line, a semiconductor layer formed on the gate insulation film, a storage contact hole having a first width exposing a portion of the semiconductor layer, and a pixel electrode having a first end portion extending along a second direction perpendicular to the first direction to electrically contact the semiconductor layer through the storage contact hole, the first end portion has a first length larger than the first width of the gate line, wherein the first width of the storage contact hole is larger than the first width of the gate line.

In another aspect, a method of fabricating a liquid crystal display device includes forming a gate line on a substrate using a first mask, depositing a first insulation layer, a semiconductor layer, and a data metal layer on the substrate to cover the gate line, forming a semiconductor layer by simultaneously patterning the first insulation layer, the semiconductor layer, and data metal layer using a second mask, depositing a second insulation layer on the substrate to cover the semiconductor layer, forming a first contact hole through the second insulation layer and the semiconductor layer by patterning the second insulation layer using a third mask, and forming a pixel electrode on the second insulation layer to extend across the gate line using a fourth mask, wherein a width of the first contact hole is larger than a width of the gate line.

In another aspect, a method of fabricating a liquid crystal display device includes forming a gate line having a first width to extend along a first direction on a substrate, forming a gate insulation film to cover the gate line, forming a semiconductor layer on the gate insulation film, forming a storage contact hole having a first width to expose a portion of the semiconductor layer, and forming a pixel electrode having a first end portion to extend along a second direction perpendicular to the first direction to electrically contact the semiconductor layer through the storage contact hole, the first end portion has a first length larger than the first width of the gate line, wherein the first width of the storage contact hole is larger than the first width of the gate line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5:
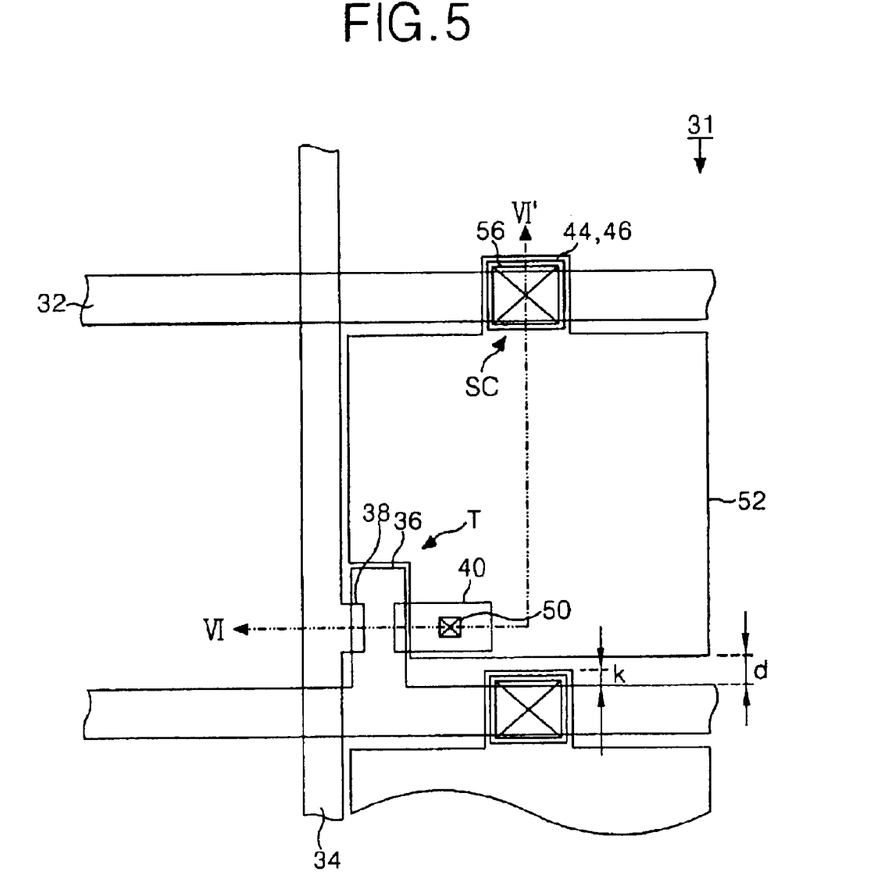
FIG. 5 is a plan view of an exemplary lower substrate of an LCD device according to the present invention.
Figure 6:
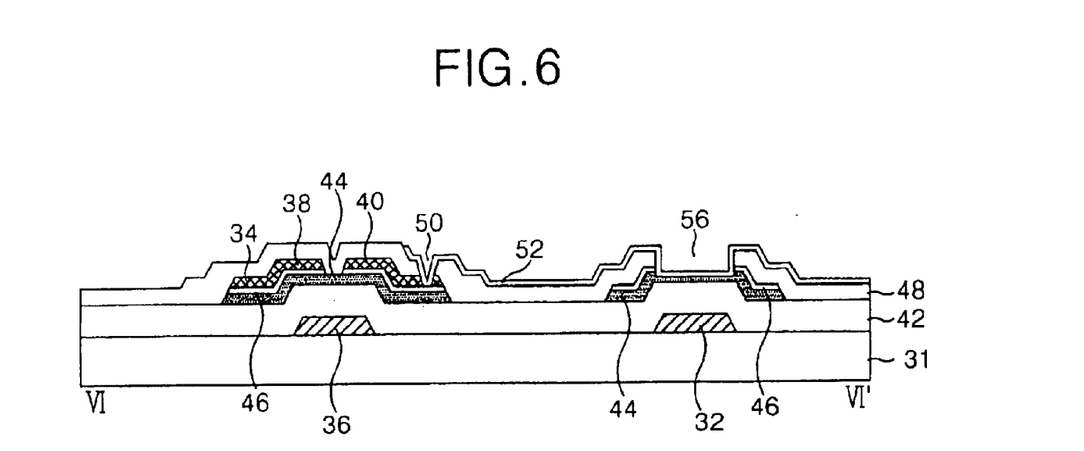
FIG. 6 is a cross sectional view along VI–VI' of FIG. 5 according to the present invention.

FIG. 5 is a plan view of an exemplary lower substrate of an LCD device according to the present invention, and FIG. 6 is a cross sectional view along VI–VI' of FIG. 5 according to the present invention. In FIGS. 5 and 6, a lower array substrate may include a TFT T located at an intersection of a data line 34 and a gate line 32, a pixel electrode 52 connected to a drain electrode 40 of the TFT T, and a storage capacitor SC located at an overlapping part of the pixel electrode 52 and the gate line 32.

The TFT T may include a gate electrode 36 connected to the gate line 32, a source electrode 38 connected to a data line 34, and the drain electrode 40 connected to the pixel electrode 52. In addition, the TFT T may include first and second semiconductor layers 44 and 46 to form a conducting channel between the source electrode 38 and the drain electrode 40 when a gate voltage is supplied to the gate electrode 36. Accordingly, the TFT T may selectively provide the pixel electrode 52 with a data signal supplied from the data line 34 in response to a gate signal supplied to the gate line 32.

The pixel electrode 52 may be located at a cell region partitioned by the data line 34 and the gate line 32, and may include transparent conducting material(s) having high light transmittance. For example, the pixel electrode 52 may be formed on a protection layer 48 overlying a gate insulation film 42, wherein a first end portion of the pixel electrode 52 may electrically contact the drain electrode 40 and a second end portion of the pixel electrode 52 may electrically contact a portion of the first and second semiconductor layers 44 and 46 overlying the gate line 32.

The pixel electrode 52 may generate a voltage difference between a common electrode (not shown) formed on an upper substrate (not shown) due to the data signal supplied through the TFT T. Accordingly, liquid crystal molecules of a liquid crystal material located between the lower substrate 31 and the upper substrate (not shown) may rotate due to dielectric anisotropy of the liquid crystal material by the voltage difference. Thus, light transmitted to the upper substrate through the pixel electrode 52 from a light source may be controlled by the rotation of the liquid crystal molecules.

The storage capacitor SC may function to restrain voltage fluctuations of the pixel electrode 52. The storage capacitor SC may include an adjacent (i.e. pre-stage) gate line 32, the pixel electrode 52 and the first and second semiconductor layers 44 and 46, and the gate insulation film 42. Accordingly, a portion of the pixel electrode 52 may be formed to extend across the pre-stage gate line 32 by a designated length "k" of about 2~3 μm. In addition, a separated distance "d" between the pixel electrode 52 and the pre-stage gate line 32 may be about 8~10 μm. Thus, the portion of the pixel electrode 52 extending across the pre-stage gate line 32 may be spaced from of an edge portion of an adjacent pixel electrode by about 6~7 μm. In addition, a first end portion of the pixel electrode 52 may electrically contact the first and second semiconductor layers 44 and 46 through a storage contact hole 56 extending through the protection layer 48, the second semiconductor layer 46 and a portion of the first semiconductor layer 44. A second end portion of the pixel electrode 52 may electrically contact the drain electrode 40 through a drain contact hole 50 extending through the drain electrode 40 to expose a portion of the second semiconductor layer 46.

In FIG. 6, a width of the storage contact hole 56 may be formed to be larger than a width of an upper surface of the gate line 32. Accordingly, a capacitance (Cst) of the storage capacitor SC increases in proportion to an overlap area between the first and second semiconductor layers 44 and 46 and the gate line 32. Thus, by forming the storage contact hole 56 to extend into the first semiconductor layer 44, a distance between the pixel electrode 52 and the gate line 32 decreases. For example, by forming the storage contact hole 56 to extend into a surface of the first semiconductor layer 44 by about 1000 Å, the capacitance (Cst) of the storage capacitor increases. In addition, a distance between the gate line 32 and the pixel electrode 52 may be about 1000 Å within the storage contact hole 56.

Furthermore, the first and second semiconductor layers 44 and 46 may function as etch-stoppers during formation of the storage contact hole 56. Accordingly, a short circuit between the pixel electrode 52 and the pre-stage gate line 32 may be prevented due to over-etching of the gate insulation film 42. For example, since etching gases used to etch the first and second semiconductor layers 44 and 46 and the gate insulation material 42 may be different from each other, a portion of the first and second semiconductor layers 44 and 46 may be not etched during etching of the protection layer 48. Thus, over-etching of the gate insulation film 42 may be prevented. In addition, since the capacitance (Cst) of the storage capacitor SC increases, stain and flicker of images on a display panel may be prevented.

Figure 7A:
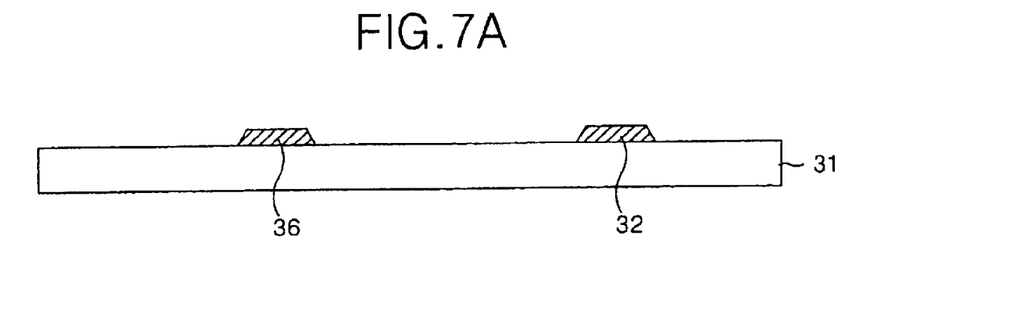
FIGS. 7A to 7F are cross sectional views of an exemplary method of fabricating a lower substrate of the LCD device of FIG. 6 according to the present invention.

FIGS. 7A to 7F are cross sectional views of an exemplary method of fabricating a lower substrate of the LCD device of FIG. 6 according to the present invention. In FIG. 7A, the gate electrode 36 and the gate line 32 may be formed on the lower substrate 31. Then, the gate metal layer may be deposited using a deposition method, such as sputtering, on the lower substrate 31, wherein aluminium (Al) or aluminium-neodymium (AlNd) may be used as the gate metal layer. Next, a first mask (not shown) may be arranged on the lower substrate 31 and the gate metal layer may be patterned by photolithograpic and etching processes, which may include exposure and development processes. Thus, the gate electrode 36 and the gate line 32 may be formed on the lower substrate 31.

Figure 7B:
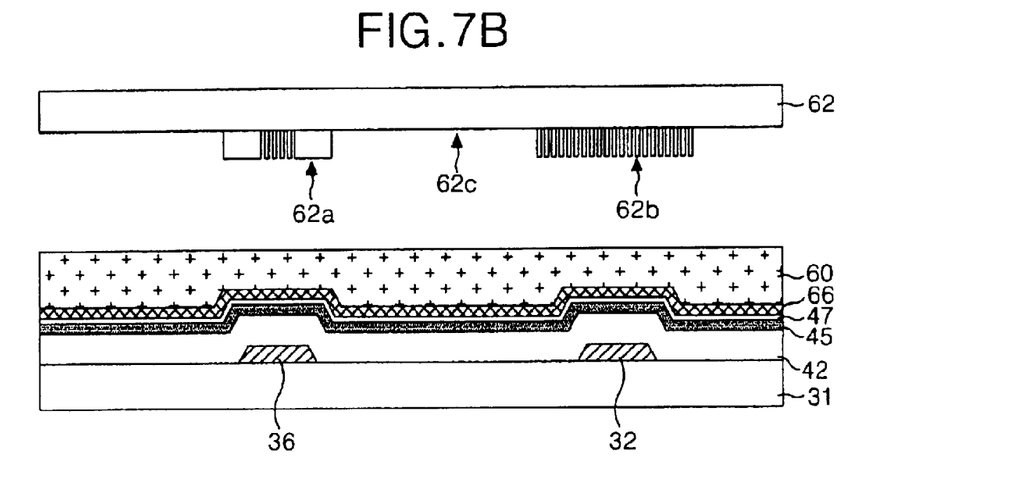

In FIG. 7B, the gate insulation film 42, first and the second semiconductor layers 45 and 47, and a data metal layer 66 may be sequentially formed by a deposition method, such as chemical vapor deposition and sputtering, on the lower substrate 31 having the gate electrode 36 and the gate line 32 formed thereon. The gate insulation film 42 may be formed to have a thickness of about 4000 Å using at least one of silicon oxide (SiOx) and/or silicon nitride (SiNx), the first semiconductor layer 45 may be formed using undoped amorphous silicon, the second semiconductor layer 47 may be formed by using impurity-doped amorphous silicon, such as N-type or P-type, and the data metal layer 66 may be formed using molybdenum (Mo) or an molybdenum alloy.

Next, a photoresist 60 may be provided on an entire surface of the data metal layer 66, and a second mask 62, which may be used as a diffraction mask, may be arranged on the lower substrate 31. The second mask 62 may include a cut-off part 62*a* corresponding to the gate electrode 36, a diffraction part 62*b* corresponding to the gate line 32, and a transmitting part 62*c* corresponding to a regions between the gate electrode 36 and the gate line 32.

Figure 7C:
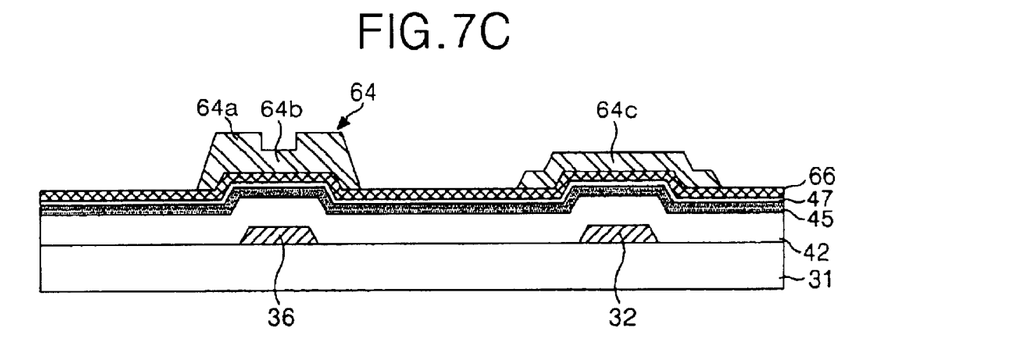

In FIG. 7C, the photoresist 60 may be patterned using photolithograpic processes, which may include exposure and development processes, using the second mask 62 arranged over the lower substrate 31 to form a photoresist pattern 64 on the data metal layer 66. In addition, a portion of the photoresist 60 corresponding to the transmitting part 62*c* of the second mask 62 may be entirely removed by photolithograpic processes. Accordingly, the first portion 64*a* of the photoresist pattern 64 may have a first height, and second and third portions 64*b* and 64*c* photoresist patterns 64 may both have a second height less than the first height.

Figure 7D:
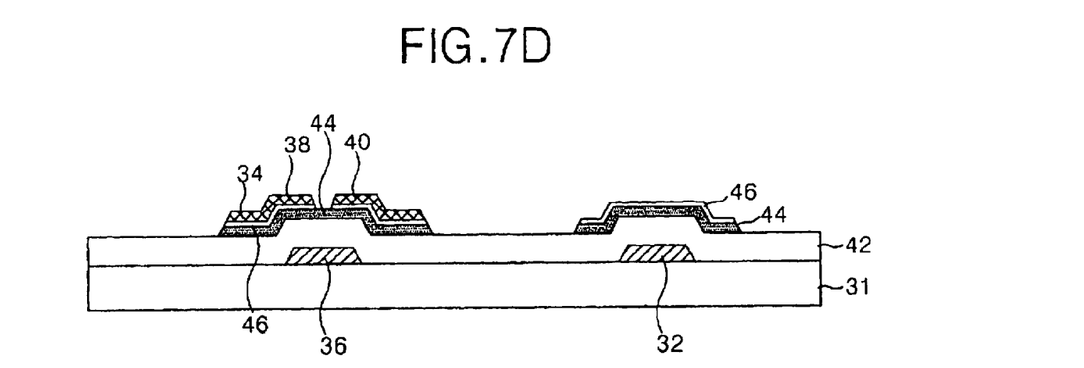

In FIG. 7D, the data metal layer 66 may be patterned by wet etching processes using the first, second, and third portions 64*a*, 64*b*, and 64*c* of the photoresist pattern 64 may be formed on the data metal layer 66 as a mask. Then, the first and second semiconductor layers 45 and 47 overlying the gate line 32 may be patterned by dry etching processes using the third portion 64*c* of the photoresist pattern 64. Similarly, the data line 34, the source electrode 38, the drain electrode 40, the active layer 44, and the ohmic contact layer 46 may be formed in regions corresponding to the first and second portions 64*a* and 64*b* of the photoresist pattern 64. In addition, the data metal layer 66 overlying the gate line 32 may be removed.

Figure 7E:
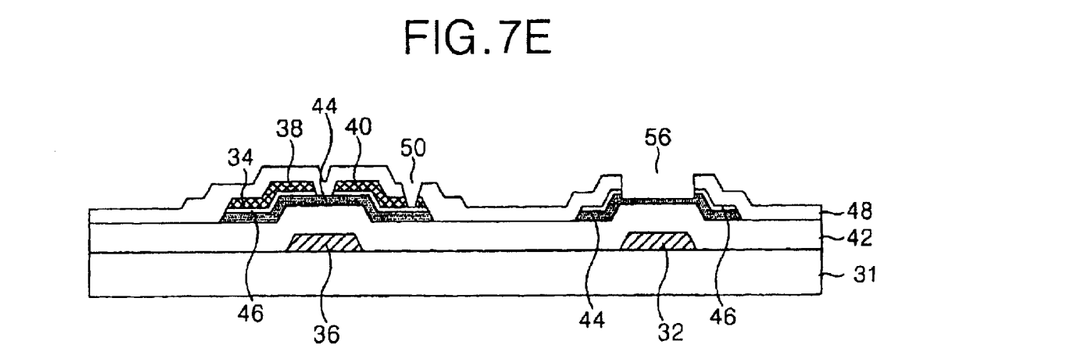

In FIG. 7E, a protection film 48 may be formed on the gate insulation film 42 having the data line 34, the source electrode 38, the drain electrode 40 formed thereon, and may include inorganic insulation material(s), such as silicon oxide (SiOx) and/or silicon nitride (SiNx), or of organic insulation material(s), such as acryl organic compounds benzocyclobutene (BCB), and/or perfluorocyclobutane (PFCB). The protection film 48 may be patterned by photolithograpic and etching processes using a third mask to form a drain contact hole 50 and a storage contact hole 56. The drain contact hole 50 may be formed to extend through the protection film 48 and through the drain electrode 40 to expose the ohmic contact layer 46. In addition, a storage contact hole 56 may be formed to extend through the protection film 48, the second semiconductor layer 46 and a portion of the first semiconductor layer 44. For example, a thickness of the first semiconductor layer 44 overlying the gate line 32 may be about 1000 Å.

Figure 7F:
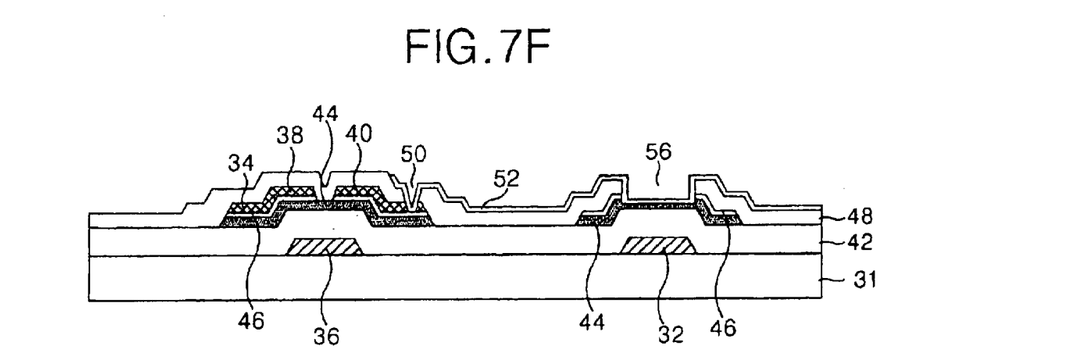

In FIG. 7F, a pixel electrode 52 may be formed on the protection film 48 by depositing transparent material(s). For example, a transparent material layer, such as Indium-Tin-Oxide (ITO), Indium-Zinc-Oxide (IZO) or Indium-Tin-Zinc-Oxide (ITZO), may be formed on the protection layer 48 by a deposition method, such as sputtering. Then, the transparent material layer may be patterned by photolithograpic and etching processes using a fourth mask to form the pixel electrode 52. For example, one end portion of the pixel electrode 52 may be formed to electrically contact the drain electrode 40 through the drain contact hole 50, and a second end portion of the pixel electrode 52 may be formed to electrically contact the first and second semiconductor layers 44 and 46 corresponding to the gate line 32 via the storage contact hole 56.

Figure 8:
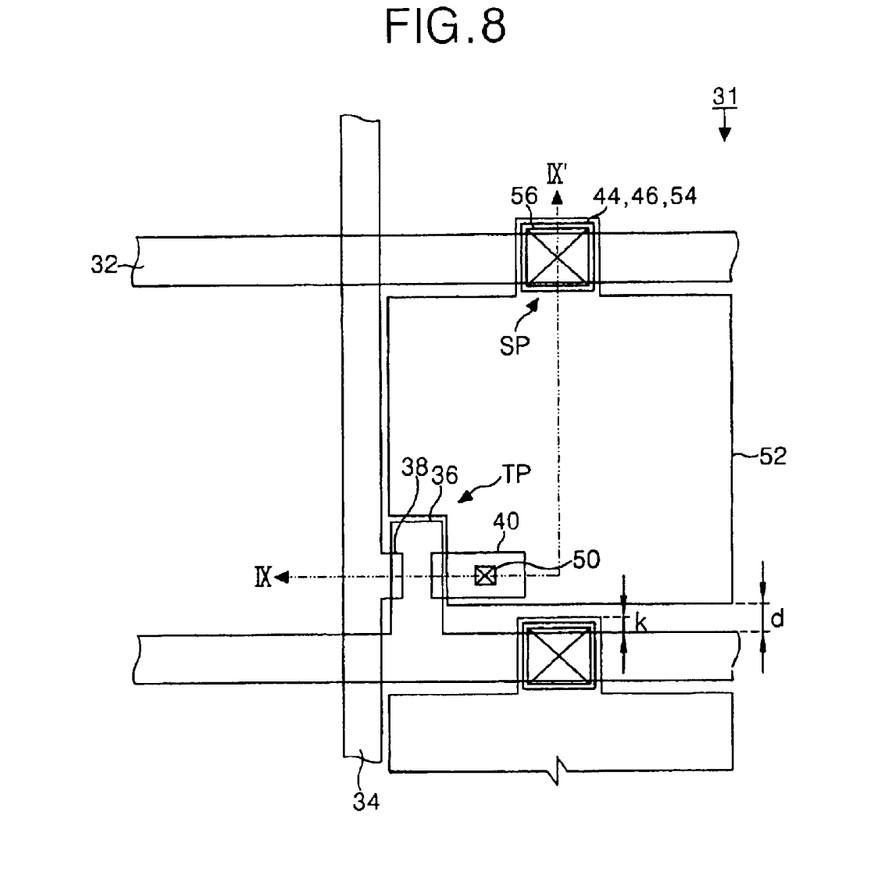
FIG. 8 is a plan view of another exemplary lower substrate of an LCD device according to the present invention.
Figure 9:
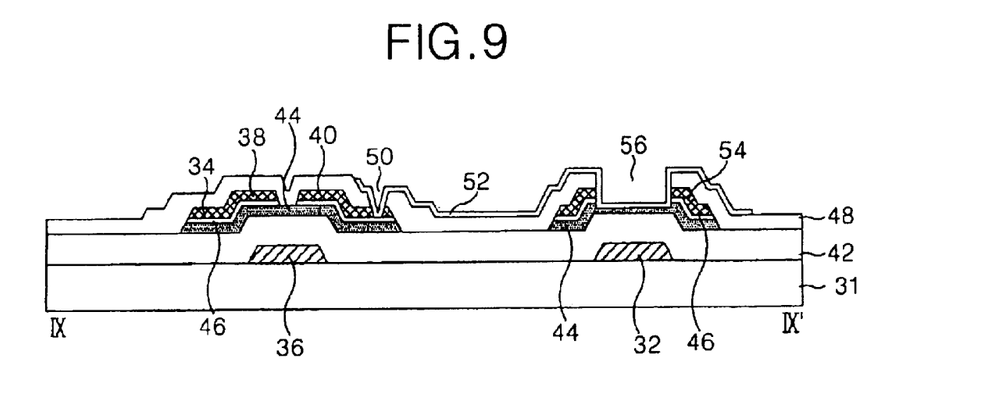
FIG. 9 is a cross sectional view along IX–IX' of FIG. 8 according to the present invention.

FIG. 8 is a plan view of another exemplary lower substrate of an LCD device according to the present invention, and FIG. 9 is a cross sectional view along IX–IX' of FIG. 8 according to the present invention. In FIGS. 8 and 9, a lower array substrate may include elements similar to those shown in FIG. 7, except that the storage capacitor SC may include portions of a metal layer used to form source and drain electrodes 38 and 40 (in FIG. 7). Accordingly, steps of removing the portions of the metal layer corresponding to the gate line 32 may be omitted.

The storage capacitor SP, as shown in FIG. 8, may function to restrain voltage fluctuations of the pixel electrode 52. In FIG. 9, the storage capacitor SP may include an adjacent (i.e. pre-stage) gate line 32, the pixel electrode 52, the first and second semiconductor layers 44 and 46, a storage electrode 54, and the gate insulation film 42. Accordingly, a portion of the pixel electrode 52 may be formed to extend across the pre-stage gate line 32 by a designated length "k" of about 2~3 µm. In addition, a separated distance "d" between the pixel electrode 52 and the pre-stage gate line 32 may be about 8~10 µm. Thus, the portion of the pixel electrode 52 extending across the pre-stage gate line 32 may be spaced from of an edge portion of an adjacent pixel electrode by about 6~7 µm. In addition, a first end portion of the pixel electrode 52 may electrically contact the first and second semiconductor layers 44 and 46 and the storage electrode 54 through a storage contact hole 56 extending through the protection layer 48. The first end portion of pixel electrode 54 may extend into the first semiconductor layer 44 such that a thickness of the first semiconductor layer 44 may be about 1000 Å.

A second end portion of the pixel electrode 52 may electrically contact the drain electrode 40 through a drain contact hole 50 extending through the drain electrode 40 to expose a portion of the second semiconductor layer 46.

In FIG. 9, a width of the storage contact hole 56 may be formed to be larger than a width of an upper surface of the gate line 32. Accordingly, a capacitance (Cst) of the storage capacitor SP (in FIG. 8) increases in proportion to an overlap area between the first and second semiconductor layers 44 and 46 and the gate line 32. Thus, by forming the storage contact hole 56 to extend into the first semiconductor layer 44, a distance between the pixel electrode 52 and the gate line 32 decreases. For example, by forming the storage contact hole 56 to extend into a surface of the first semiconductor layer 44 by about 1000 Å, the capacitance (Cst) of the storage capacitor SP (in FIG. 8) increases. In addition, a distance between the gate line 32 and the pixel electrode 52 may be about 1000 Å within the storage contact hole 56.

Furthermore, the first and second semiconductor layers 44 and 46 may function as etch-stoppers during formation of the storage contact hole 56. Accordingly, a short circuit between the pixel electrode 52 and the pre-stage gate line 32 may be prevented due to over-etching of the gate insulation film 42. For example, since etching gases used to etch the first and second semiconductor layers 44 and 46 and the gate insulation material 42 may be different from each other, a portion of the first and second semiconductor layers 44 and 46 may be not etched during etching the protection layer 48. Thus, over-etching of the gate insulation film 42 may be prevented. In addition, since the capacitance (Cst) of the storage capacitor SP increases, stain and flicker of images on a display panel may be prevented.

In addition, a distance between the gate line 32 and the pixel electrode 52 (i.e., a thickness of the gate insulation film 42) may be about 4000 Å, and a thickness of the first semiconductor layer 44 may be about 1500 Å. Accordingly, the first and second semiconductor layers 44 and 46 may function as etch-stoppers during formation of the storage contact hole 56. Thus, a short circuit between the pixel electrode 52 and the pre-stage gate line 32 may be prevented due to over-etching of the gate insulation film 42. For example, since etching gases of the gate insulation film 42 and the protection film 48 may be different, portions of the first and second semiconductor layers 44 and 46 may not be etched. Accordingly, over-etching of the gate insulation film 42 may be prevented.

Furthermore, since the capacitance (Cst) of the storage capacitor CP increases, a feed-through voltage (ΔVp) may be lowered to prevent image stain and flicker.

Figure 10A:
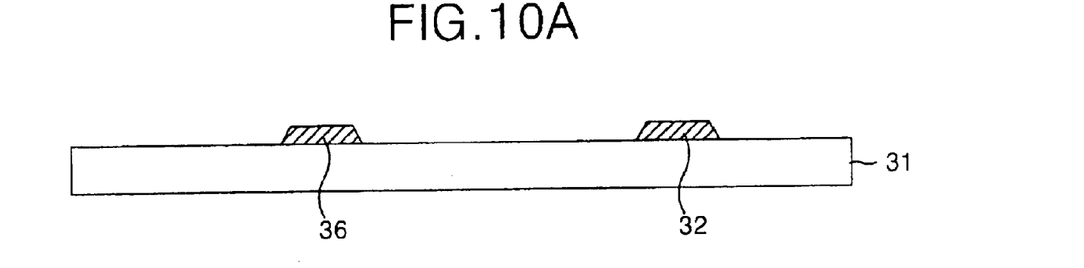
FIGS. 10A to 10F are cross sectional views of another exemplary method of fabricating a lower substrate of the LCD device of FIG. 9 according to the present invention.

FIGS. 10A to 10F are cross sectional views of another exemplary method of fabricating a lower substrate of the LCD device of FIG. 9 according to the present invention. In FIG. 10A, the gate electrode 36 and the gate line 32 may be formed on the lower substrate 31, wherein the gate metal layer may be deposited by a depositing method, such as sputtering, on the lower substrate 31 using aluminium (Al) or an aluminiumneodymium (AlNd) single layer structure. Then, a first mask (not shown) may be arranged over the lower substrate 31 and the gate metal layer may be patterned by photolithograpic and etching processes, which may include exposure and development processes. Thus, the gate electrode 36 and the gate line 32 may be formed on the lower substrate 31.

Figure 10B:
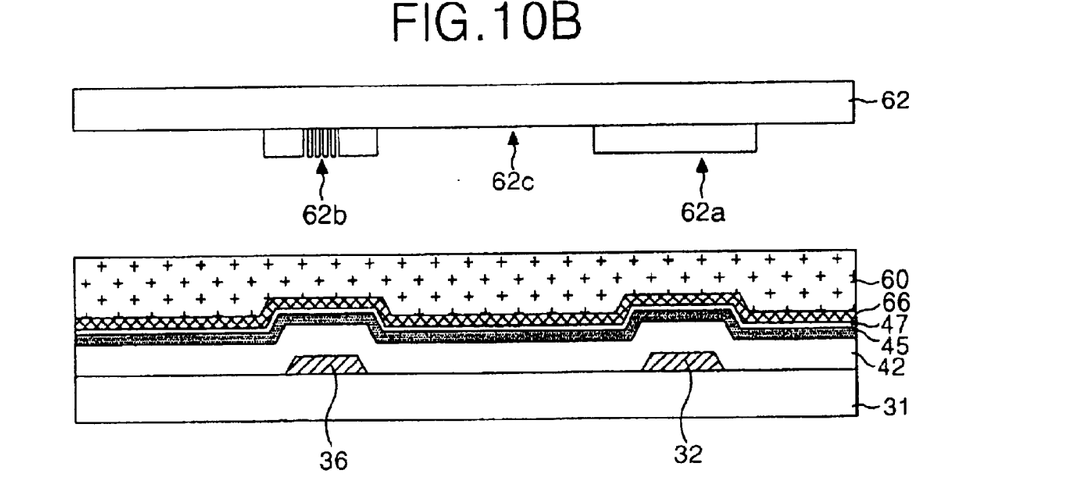

In FIG. 10B, the gate insulation film 42, the first and the second semiconductor layers 45 and 47, and the data metal layer 66 may be sequentially formed by a depositing method, such as chemical vapor deposition and sputtering, on the lower substrate 31 having the gate electrode 36 and the gate line 32 formed thereon.

The gate insulation film 42 may be formed to have a thickness of about 4000 Å using inorganic insulating material(s), such as silicon oxide (SiOx) or silicon nitride (SiNx). The first semiconductor layer 45 may include undoped amorphous silicon, and the second semiconductor layer 47 may include impurity-doped amorphous silicon, such as N-type or P-type, and the data metal layer 66 may include molybdenum (Mo) or a molybdenum alloy.

Next, a photoresist 60 may be applied on an entire surface of the data metal layer 66, and a second mask 62 may be arranged over the lower substrate 31 to function as a diffraction mask. The second mask 62 may include a cut-off part 62a, a diffraction part 62b, and a transmitting part 62c.

Figure 10C:
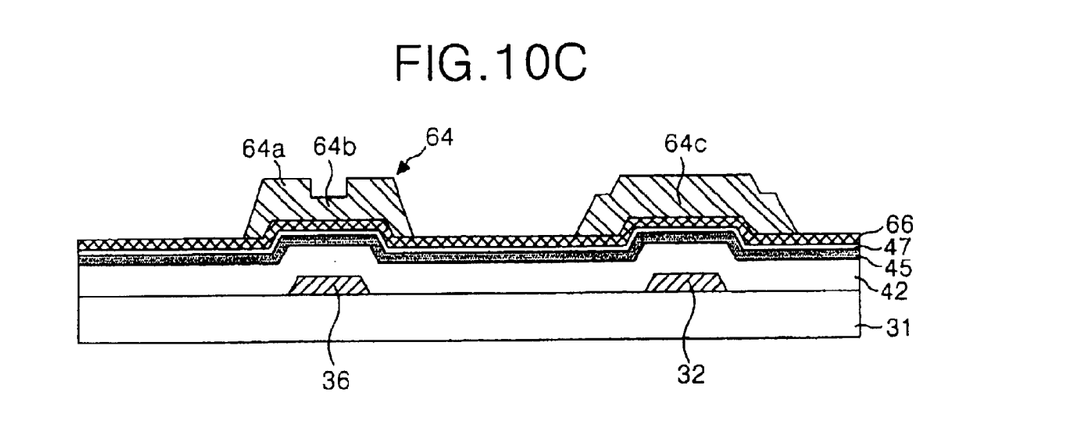
Figure 10D:
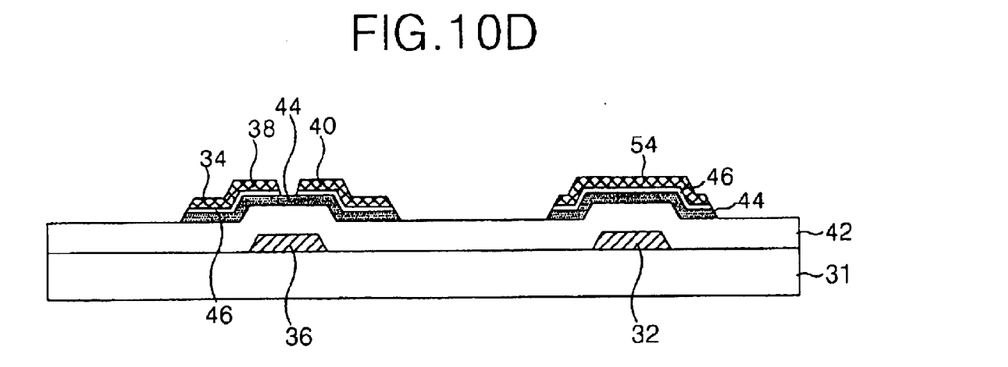

In FIG. 10C, the photoresist 60 may be patterned using photolithograpic processes, which may include exposure and development processes, using the second mask 62 arranged over the lower substrate 31 to form a photoresist pattern 64 on the data metal layer 66. In addition, a portion of the photoresist 60 corresponding to the transmitting part 62c of the second mask 62 may be entirely removed by photolithograpic processes. Accordingly, the first portion 64a of the photoresist pattern 64 may have a first height, and second and third portions 64b and 64c photoresist patterns 64 may both have a second height less than the first height.

In FIG. 7D, the data metal layer 66 may be patterned by wet etching processes using the first, second, and third portions 64a, 64b, and 64c of the photoresist pattern 64 may be formed on the data metal layer 66 as a mask. Then, the first and second semiconductor layers 45 and 47 overlying the gate line 32 may be patterned by dry etching processes using the third portion 64c of the photoresist pattern 64. Similarly, the data line 34, the source electrode 38, the drain electrode 40, the active layer 44, and the ohmic contact layer 46 may be formed in regions corresponding to the first and second portions 64a and 64b of the photoresist pattern 64. In addition, storage electrode 54 may be formed on the first and second semiconductor layers 44 and 46.

Figure 10E:
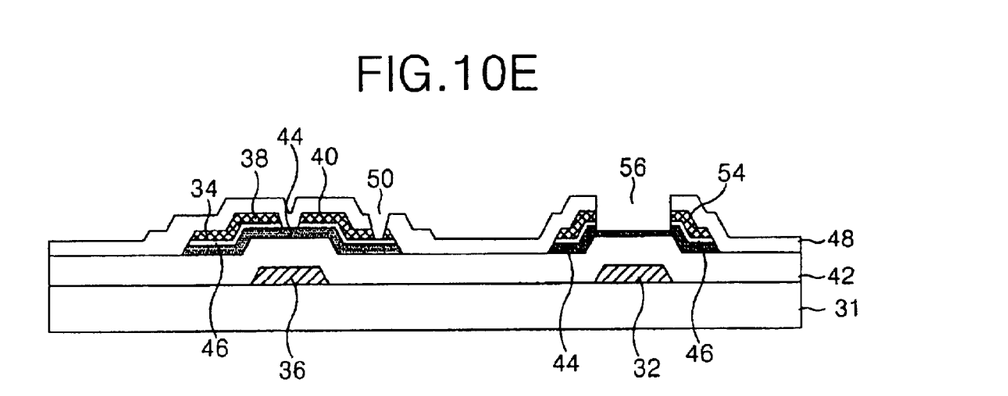

In FIG. 10E, a protection film 48 may be formed on the gate insulation film 42 having the data line 34, the source electrode 38, the drain electrode 40 formed thereon, and may include inorganic insulation material(s), such as silicon oxide (SiOx) and/or silicon nitride (SiNx), or of organic insulation material(s), such as acryl organic compounds benzocyclobutene (BCB), and/or perfluorocyclobutane (PFCB). The protection film 48 may be patterned by photolithograpic and etching processes using a third mask to form a drain contact hole 50 and a storage contact hole 56. The drain contact hole 50 may be formed to extend through the protection film 48 and through the drain electrode 40 to expose the ohmic contact layer 46. In addition, a storage contact hole 56 may be formed to extend through the protection film 48, the storage electrode 54, the second semiconductor layer 44, and a portion of the first semiconductor layer 44. For example, a thickness of the first semiconductor layer 44 overlying the gate line 32 may be about 1000 Å.

Figure 10F:
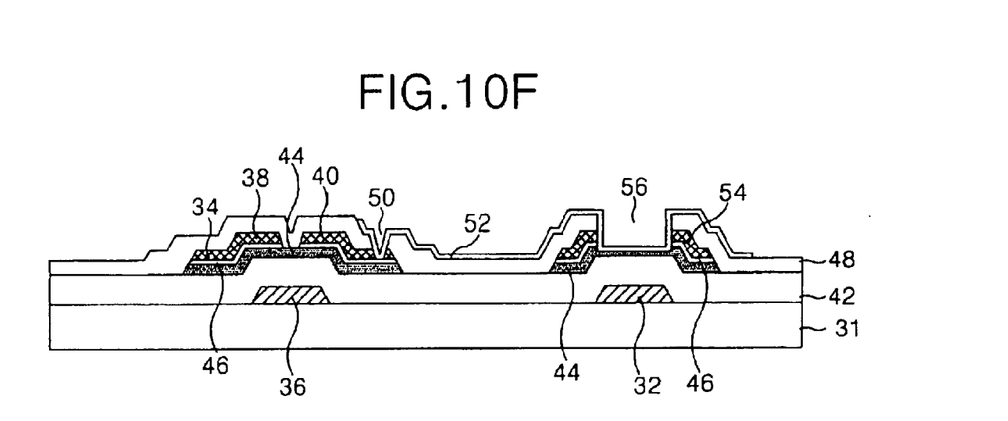

In FIG. 10F, a pixel electrode 52 may be formed on the protection film 48 by depositing transparent material(s). For example, a transparent material layer, such as Indium-Tin-Oxide (ITO), Indium-Zinc-Oxide (IZO) or Indium-Tin-Zinc-Oxide (ITZO), may be formed on the protection layer 48 by a deposition method, such as sputtering. Then, the transparent material layer may be patterned by photolithograpic and etching processes using a fourth mask to form the pixel electrode 52. For example, one end portion of the pixel electrode 52 may be formed to electrically contact the drain electrode 40 through the drain contact hole 50, and a second end portion of the pixel electrode 52 may be formed to electrically contact the storage electrode 54 and the first and second semiconductor layers 44 and 46 corresponding to the gate line 32 via the storage contact hole 56.

It will be apparent to those skilled in the art that various modifications and variations can be made in the liquid crystal display device and method of fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a gate line having a first width formed extending along a first direction on a substrate;
    a gate insulation film formed to cover the gate line;
    a semiconductor layer formed on the gate insulation film;
    a storage contact hole through a portion of the semiconductor layer having a first width exposing a portion of the semiconductor layer; and
    a pixel electrode having a first end portion extending along a second direction perpendicular to the first direction to electrically contact the semiconductor layer through the storage contact hole, the first end portion has a first length larger than the first width of the gate line,
    wherein the first width of the storage contact hole is larger than the first width of the gate line.

2. The device according to claim 1, wherein the first end portion of the pixel electrode extends past the gate line by a first distance of about 6~7 µm.

3. The device according to claim 1, wherein a thickness of the gate insulation film is about 4000 Å and a thickness of the semiconductor layer contacting the pixel electrode is about 1000 Å.

4. The device according to claim 1, further comprising a storage electrode formed on the semiconductor layer such that the pixel electrode contacts lateral portions of the storage electrode and the semiconductor layer.

5. The device according to claim 1, wherein a thickness of the gate insulation film is about 4000 Å and a thickness of the semiconductor layer contacting the pixel electrode is about 1500 Å.

6. The device according to claim 1, further comprising a thin film transistor formed in an intersection region of the gate line and the data line.

7. The device according to claim 6, wherein the thin film transistor comprises:
 a gate electrode connected to the gate line;
 a source electrode connected to the data line; and
 a drain electrode connected to a second end portion of the pixel electrode.

8. The device according to claim 7, wherein the second end portion of the pixel electrode extends through the drain electrode to contact a portion of the semiconductor layer.

9. A method of fabricating a liquid crystal display device, comprising:
 forming a gate line on a substrate using a first mask;
 depositing a first insulation layer, a semiconductor layer, and a data metal layer on the substrate to cover the gate line;
 forming a semiconductor layer by simultaneously patterning the first insulation layer, the semiconductor layer, and data metal layer using a second mask;
 depositing a second insulation layer on the substrate to cover the semiconductor layer;
 forming a first contact hole through the second insulation layer and the semiconductor layer by patterning the second insulation layer using a third mask; and
 forming a pixel electrode on the second insulation layer to extend across the gate line using a fourth mask,
 wherein a width of the first contact hole is larger than a width of the gate line.

10. The method according to claim 9, further comprising:
 forming a gate electrode on the substrate using the first mask;
 forming the semiconductor layer, a source electrode, and a drain electrode by simultaneously patterning the semiconductor layer and the data metal layer using the second mask; and
 forming a second contact hole by patterning the second insulation layer using the third mask.

11. The method according to claim 9, further comprising forming a storage electrode by patterning the semiconductor layer and the data metal layer using the second mask.

12. The method according to claim 9, wherein the data metal layer includes at least one of a molybdenum (Mo) and an molybdenum alloy.

13. A method of fabricating a liquid crystal display device, comprising:
 forming a gate line having a first width to extend along a first direction on a substrate;
 forming a gate insulation film to cover the gate line;
 forming a semiconductor layer on the gate insulation film;
 forming a storage contact hole having a first width to expose a portion of the semiconductor layer; and
 forming a pixel electrode having a first end portion to extend along a second direction perpendicular to the first direction to electrically contact the semiconductor layer through the storage contact hole, the first end portion has a first length larger than the first width of the gate line,
 wherein the first width of the storage contact hole is larger than the first width of the gate line.

14. The method according to claim 13, wherein the first end portion of the pixel electrode extends past the gate line by a first distance of about 6~7 µm.

15. The method according to claim 13, wherein a thickness of the gate insulation film is about 4000 Å and a thickness of the semiconductor layer contacting the pixel electrode is about 1000 Å.

16. The method according to claim 13, further comprising forming a storage electrode on the semiconductor layer such that the pixel electrode contacts lateral portions of the storage electrode and the semiconductor layer.

17. The method according to claim 5, wherein a thickness of the gate insulation film is about 4000 Å and a thickness of the semiconductor layer contacting the pixel electrode is about 1500 Å.

18. The method according to claim 13, further comprising forming a thin film transistor at an intersection region of the gate line and the data line.

19. The method according to claim 18, wherein forming the thin film transistor comprises:
 forming a gate electrode to be connected to the gate line;
 forming a source electrode to be connected to the data line; and
 forming a drain electrode to be connected to a second end portion of the pixel electrode.

20. The method according to claim 19, wherein the second end portion of the pixel electrode extends through the drain electrode to contact a portion of the semiconductor layer.

21. A liquid crystal display device, comprising:
 a gate line having a first width formed extending along a first direction on a substrate;
 a gate insulation film formed to cover the gate line;
 a semiconductor layer formed on the gate insulation film;
 a storage contact hole through a portion of the semiconductor layer having a first width exposing a portion of the semiconductor layer; and
 a pixel electrode having a first end portion extending along a second direction perpendicular to the first direction to electrically contact the semiconductor layer through the storage contact hole.

22. The device according to claim 21, wherein the first end portion has a first length larger than the first width of the gate line.

23. The device according to claim 21, wherein the first width of the storage contact hole is larger than the first width of the gate line.

24. A method of fabricating a liquid crystal display device, comprising:
 forming a gate line on a substrate using a first mask;
 depositing a first insulation layer, a semiconductor layer, and a data metal layer on the substrate to cover the gate line;
 forming a semiconductor layer by simultaneously patterning the first insulation layer, the semiconductor layer, and data metal layer using a second mask;

depositing a second insulation layer on the substrate to cover the semiconductor layer;

forming a first contact hole through the second insulation layer and the semiconductor layer by patterning the second insulation layer using a third mask; and forming a pixel electrode on the second insulation layer to extend across the gate line using a fourth mask.

25. The method according to claim 24, wherein a width of the first contact hole is larger than a width of the gate line.

26. A method of fabricating a liquid crystal display device, comprising:

forming a gate line having a first width to extend along a first direction on a substrate;

forming a gate insulation film to cover the gate line;

forming a semiconductor layer on the gate insulation film;

forming a storage contact hole having a first width to expose a portion of the semiconductor layer; and forming a pixel electrode having a first end portion to extend along a second direction perpendicular to the first direction to electrically contact the semiconductor layer through the storage contact hole.

27. The method according to claim 26, wherein the first end portion has a first length larger than the first width of the gate line.

28. The method according to claim 27, wherein the first width of the storage contact hole is larger than the first width of the gate line.

29. A liquid crystal display device, comprising:

a gate line on a substrate;

a gate insulation film formed to cover the gate line;

a semiconductor layer formed on the gate insulation film;

a storage contact hole through a portion of the semiconductor layer exposing a portion of the semiconductor layer; and a pixel electrode having a first end portion electrically contacting the semiconductor layer through the storage contact hole.

* * * * *